United States Patent

Taguchi et al.

Patent Number: 6,050,480
Date of Patent: Apr. 18, 2000

[54] SOLDER PASTE FOR CHIP COMPONENTS

[75] Inventors: Toshihiko Taguchi, Kitakatsushika-gun; Rikiya Katoh, Soka; Osamu Munekata, Koshigaya; Yoshitaka Toyoda, Satte, all of Japan

[73] Assignee: Senju Metal Industry, Co., Ltd., Tokyo, Japan

[21] Appl. No.: 08/970,203

[22] Filed: Nov. 14, 1997

[30] Foreign Application Priority Data

Nov. 14, 1996 [JP] Japan .................................. 8-316883

[51] Int. Cl.⁷ ............................ B23K 31/00; B23K 31/02
[52] U.S. Cl. .................................. 228/248.1; 228/180.22
[58] Field of Search ........................... 228/248.1, 180.22, 228/248.5

[56] References Cited

U.S. PATENT DOCUMENTS 5,514,912  5/1996  Ogashiwa ................................. 257/784
5,690,890  11/1997  Kawashima et al. .................... 420/559

*Primary Examiner*—Patrick Ryan
*Assistant Examiner*—Hiley Stoner
*Attorney, Agent, or Firm*—Sughrue, Mion, Zinn, Macpeak & Seas, PLLC

[57] ABSTRACT

A solder paste suitable for use in reflow soldering of chip components having good soldering properties without causing tombstoning comprises a solder powder admixed with a viscous flux. The solder powder is comprised of a twin peak solder alloy consisting essentially, on a weight basis, of: 60–65% Sn, 0.1–0.6% Ag, 0.1–2% Sb, and a balance of Pb, and having a liquidus temperature below 200° C.

7 Claims, 2 Drawing Sheets

SOLDER PASTE FOR CHIP COMPONENTS

BACKGROUND OF THE INVENTION

The present invention relates to a solder paste suitable for use in mounting chip components on a printed circuit board by reflow soldering in a furnace.

In view of the recent trend toward reduction in size and weight of electronic equipment, electronic devices used in electronic equipment may have very small dimensions. For example, chip components called 1005, which are useful as passive devices such as chip capacitors and chip resistors, have rectangular dimensions of 1 mm by 0.5 mm, which could not be expected a decade ago.

As well known in the art, chip components are leadless electronic devices, particularly passive electronic devices, suitable for surface mount technology, like QFPs and SOICs in active devices (IC packages), by being mounted directly on a printed circuit board having metallic pads (lands) so as to bond the electrodes of the chip components to the lands of the circuit board through solder.

In general, soldering methods which can be applied to electronic devices include iron soldering, flow soldering, and reflow soldering.

Iron soldering is performed manually by an operator who holds a soldering iron and a flux-cored wire solder in his hands. This soldering method is not usable for soldering of chip components since a large number of chip components are densely mounted on a printed circuit board with tiny spaces between adjacent chip components, which are too small for a soldering iron to be inserted into the spaces to perform soldering. In addition, the productivity of iron soldering is unacceptably low because the large number of chip components mounted on the circuit board must be soldered one by one.

Flow soldering is carried out by contacting the surface of a printed circuit board with molten solder. In this soldering method, a large number of soldered joints can be formed in a single operation, resulting in good productivity.

However, since the printed circuit board is positioned with its surface to be soldered facing down, chip components directly mounted on the circuit board must be previously fixed thereon with an adhesive. Accordingly, flow soldering method requires an additional bothersome step of application of an adhesive to the areas of the printed circuit boards on which chip components are to be mounted.

Furthermore, in the case where a large number of chip components are densely mounted with small spaces on a circuit board, flow soldering may cause a soldering defect called bridging, which results from adhesion of the solder to the circuit board so as to connect adjacent chip components. The occurrence of bridging on a printed circuit board is entirely unacceptable since it results in malfunction of the electronic equipment containing the components. Moreover, since the flow soldering method causes the entire lower surface of the printed circuit board to contact the molten solder, the solder may adhere to undesirable areas on that surface, leading to failure due to an unexpected electrical connection.

Reflow soldering is typically performed by using a solder paste, which is a highly viscous paste formed by uniformly admixing a fine powder solder with a flux, which is a fluid typically comprising a rosin or other organic resin, an activator, a solvent, and optionally a thixotropic agent.

The solder paste is applied by screen printing through a metal mask or silk screen to the areas on the surface of a printed circuit board on which chip components or other electronic devices are to be mounted. The electronic devices are then mounted on the applied solder paste and temporarily fixed in place by the tackiness or adhesion of the applied solder paste. The printed circuit board having the electronic devices mounted thereon is then heated, usually in a furnace, to melt the solder powder in the paste, and it is then cooled to solidify the molten solder, thereby forming soldered joints between the mounted electronic devices and the circuit board.

In the reflow soldering method, since the solder paste can be applied solely to the desired areas on the printed circuit board by printing, adhesion of the solder to undesirable areas on the circuit board can be avoided and the occurrence of bridging is minimized, resulting in an improvement in reliability of soldering. Furthermore, its productivity is good since there is no need to apply an adhesive before electronic devices are mounted on the circuit board and a large number of soldered joints can be formed by a single operation of the printing and heating steps. In view of these advantages, most chip components and other electronic devices are currently soldered by the reflow soldering method.

The powder solders used in conventional solder pastes for reflow soldering are mostly formed from a eutectic solder alloy which has an alloy composition equal or close to the eutectic Sn—Pb alloy (61.9% Sn—39.1% Pb), e.g., a composition consisting of about 63% Sn and about 37% Pb. The eutectic solder alloys have a eutectic temperature (at which the solidus temperature is the same as the liquidus temperature) at about 183° C. which is the lowest melting temperature of Sn—Pb based solder alloys.

In general, a soldering temperature (soldering peak temperature) of about 50° C. higher than the liquidus temperature of the solder alloy is considered to be most suitable. In reflow soldering, the entire printed circuit board is heated in a furnace to cause the applied solder paste to reflow, and therefore the electronic devices mounted on the circuit board are inevitably exposed to the same temperature as the solder paste. In order to minimize the effect of heat on the electronic devices in the heating step, the use of a solder alloy having a liquidus temperature as low as possible is recommended so as to decrease the soldering temperature. For this reason, the above-described eutectic solder alloys have been mostly used in the prior art in reflow soldering.

When a eutectic solder alloy is used to solder chip components by reflow soldering, however, tombstoning (also called the Manhattan phenomenon), which is a phenomenon in which a chip component is detached from the printed circuit board at one end while remaining bonded to the circuit board at the opposite end, whereby the one end rises and the chip component assumes a more or less vertical orientation, takes place frequently. Tombstoning is caused by a difference of time at which the solder paste is melted at opposite ends during heating in a furnace. Namely, when melting of the solder paste which adheres to a first electrode located at one end of the chip component occurs earlier than melting of the solder paste adhering to a second electrode located at the opposite end of the chip component, the earlier melted solder paste acts to pull down the first electrode by the surface tension force of the molten solder. As a result, the opposite end of the chip component on which the second electrode is located is detached from the circuit board and raised toward an upright position, since the solder paste adhering to the second electrode has not been melted and no pulling force is exerted on the second electrode.

The tombstoning phenomenon can be prevented by controlling the phases appearing during transformation of the solder alloy from a liquid phase to a solid phase. Japanese Patent Application Laid-Open (Kokai) No. 5-212580(1993) proposes that the use of a "twin-peak" solder alloy, which has two peaks in a DSC (differential scanning calorimeter) curve, in reflow soldering of chip components is effective for preventing the tombstoning phenomenon. The twin-peak solder alloys disclosed in that patent application include such alloys as Sn—3%Ag—1%Cu—4%Pb, Sn—10%Zn—4%Pb, Sn—5%Pb—1.2%Ag, and Sn—10%Pb—1.2%Ag, in which all the percents are by weight.

The DSC curve of a eutectic Sn—Pb solder alloy (63%Sn—Pb) is shown in FIG. 2. As can be seen from this figure, only a single peak appears in the DSC curve and the range between the solidus and liquidus temperatures, i.e., solidification temperature range, is relatively narrow.

Although the above-described twin-peak solder alloys have a significant effect on prevention of tombstoning, they have a higher liquidus temperature which exceeds 200° C. Therefore, the soldering temperature, which is the actual temperature at which soldering is performed, should be 250° C. or higher, which may cause thermal damage to the chip components or other electronic devices mounted on the circuit board. In addition, these twin-peak alloys have another disadvantage in that their soldering properties are slightly inferior to those of the eutectic solder alloys.

SUMMARY OF THE INVENTION

It is an object of the present invention to provide a solder paste suitable for use in reflow soldering of chip components which can eliminate the problem of tombstoning.

Another object of the present invention is to provide such a solder paste having good soldering properties and containing a powdered solder alloy with a liquidus temperature below 200° C. so as to minimize thermal damage to electronic devices during reflow soldering.

The present inventors have found that a twin peak solder alloy having a wide solidification temperature range, which is effective for prevention of tombstoning, can be obtained by adding slight amounts of Ag and Sb to a solder alloy having a composition close to a eutectic solder alloy which has good soldering properties.

The present invention provides a solder paste for use in reflow soldering of chip components comprising a solder powder admixed with a viscous flux wherein the solder powder has a composition consisting essentially, on a weight basis, of: 60–65% Sn, 0.1–0.6% Ag, 0.1–2% Sb, and a balance of Pb.

As described previously, the term "twin-peak solder alloy" indicates that the alloy has two exothermal peaks between the liquidus and solidus temperatures in its DSC heating curve. In the peak temperatures, there occur some phase transformations.

DETAILED DESCRIPTION OF THE INVENTION

Figure 1:
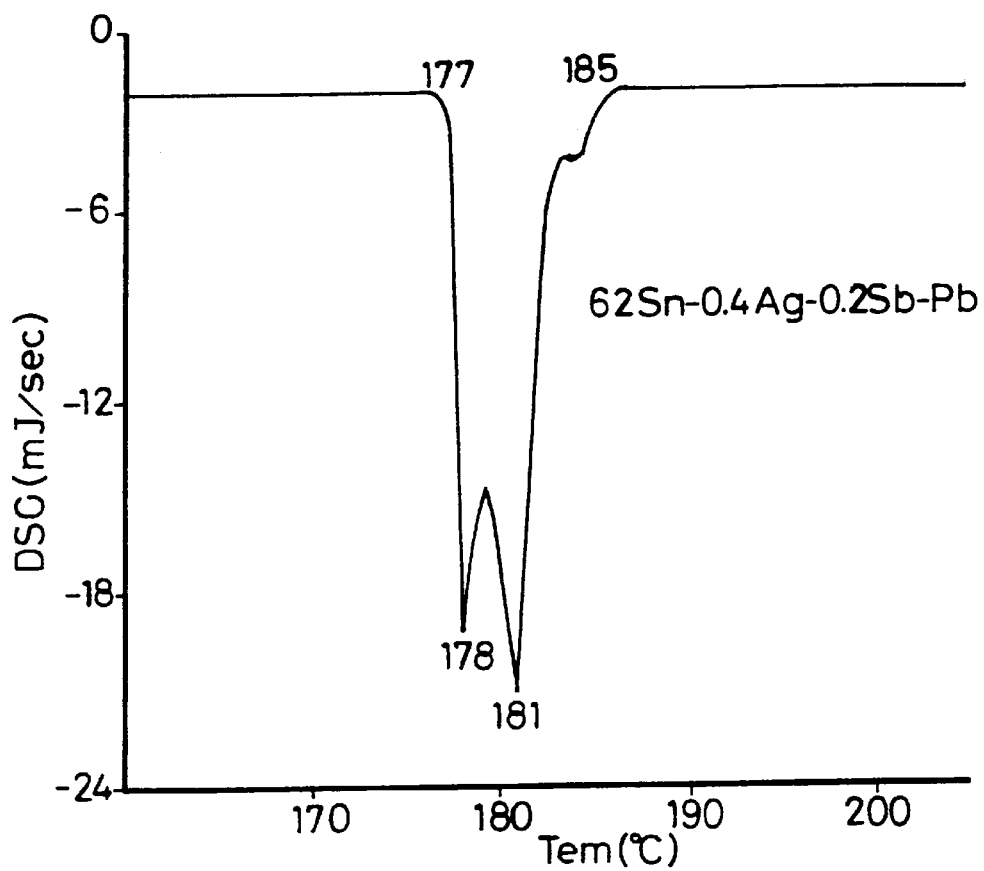
FIG. 1 is a DSC (differential scanning calorimetry) curve of a solder alloy used in an example according to the present invention.
Figure 2:
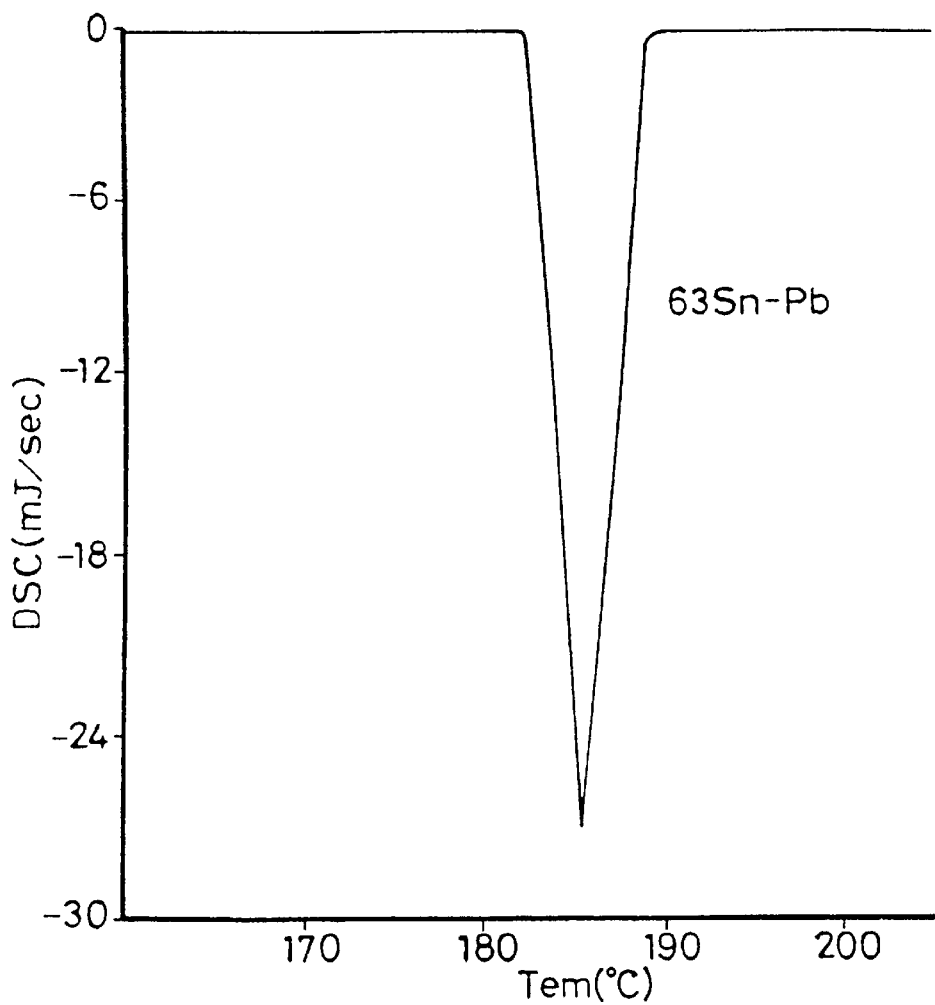
FIG. 2 is a DSC curve of a eutectic solder alloy used in a conventional solder paste.

The solder paste according to the present invention comprises a solder powder admixed with a viscous flux, the solder powder having an alloy composition which consists essentially, on a weight basis, of: 60–65% Sn, 0.1–0.6% Ag, 0.1–2% Sb, and a balance of Pb.

Since the alloy composition of the solder is close to that of a eutectic solder alloy, it has a low liquidus temperature of 200° C. or below and good soldering properties, which make it possible to perform reflow soldering without thermal damage to electronic components. The liquidus temperature of the solder alloy is preferably in the range of from 184 to 195° C. By the addition of minor amounts of Ag and Sb in combination, the solder alloy has twin peaks in its DSC curve, and the solidification temperature range is wide enough to prevent chip components from tombstoning during reflow soldering. The solidification temperature range is preferably at least 50° C. and more preferably at least 8° C.

If the Sn content is less than 60% or more than 65%, the solder paste will have a liquidus temperature above 200° C. and its soldering properties will be adversely affected. Preferably, the Sn content is 61–64% and more preferably 61–63%.

If the solder alloy has an Ag content of less than 0.1% or more than 0.6%, the twin peaks in the DSC curve will disappear and the effect of the solder paste on prevention of tombstoning will be lost. Preferably, the Ag content is 0.2–0.5% and more preferably 0.3–0.5%.

If the solder alloy has an Sb content of less than 0.1%, it will not have a solidification temperature range wide enough to prevent tombstoning. If the Sb content is more than 2%, the solder alloy will have a liquidus temperature above 200° C. so that a high soldering temperature above 250° C., which adversely affects electronic devices, is required. In addition, the soldering properties of the solder paste will be impaired. Preferably, the Sb content is 0.1–1% and more preferably 0.1–0.5%.

A solder paste may be prepared by admixing the solder powder with a viscous flux in a conventional manner. Normally the solder powder has a particle size between 100 and 400 mesh. Such a solder powder may be prepared by any appropriate technique including inert gas (e.g., argon or nitrogen gas) atomization and centrifugal spraying.

The viscous flux to be admixed with the solder powder may be either a non-water soluble flux or a water-soluble flux. A typical non-water soluble flux is a rosin-based flux, but other non-water soluble fluxes may be used. The rosin may be either polymerized or unpolymerized one. The flux normally comprises a base material such as a rosin, a small amount of an activator, and optionally a thixotropic agent in a solvent. Examples of the activator for rosin include amine hydrohalide salts, amine organic acid salts, and organic acids. Examples of the thixotropic agent include a hydrogenated castor oil. The solvent useful for non-water soluble fluxes includes glycol ethers, lower alcohols, and terpene.

The proportions of the solder powder and the flux are selected so as to give an admixture having a consistency suitable for printing. Generally, the weight ratio of the solder powder to the flux is in the range of from 80:20 to 95:5 and preferably from 85:15 to 92:8.

The solder paste can be applied to selected areas on a printed circuit board by screen printing. After electronic devices are mounted on the applied solder paste, the circuit board is heated in a reflow furnace to melt the solder alloy, thereby bonding the electronic devices to the circuit board. The peak surface temperature of the circuit board when heated is preferably below 250° C. and most suitably about 50° C. above the liquidus temperature of the solder alloy present in the paste.

EXAMPLES

The following examples are presented to further illustrate the present invention. These examples are to be considered in all respects as illustrative and not restrictive. In the examples, all the parts and percents are by weight unless otherwise indicated.

Example 1

A solder powder having an alloy composition of 62%Sn—0.4%Ag—0.2%Sb—Pb (Pb: remainder) was prepared by inert gas atomization and sieved to collect those particles having a diameter of from 20 to 40 μm.

Ninety (90) parts of the solder powder were admixed with 10 parts of a viscous flux having the following composition to give a solder paste having a high consistency.

Composition of Flux

60% Polymerized rosin

1% Diethylamine hydrochloride (activator)

5% Hydrogenated castor oil (thixotropic agent)

34% Butylcarbitol (solvent)

The solder paste was applied with a predetermined pattern onto a printed circuit board by screen printing through a metal mask, and 100 pieces of 1005-type chip capacitors were mounted on the applied solder paste. The printed circuit board was then heated in a reflow furnace to effect soldering. The temperature profile of the reflow furnace consisted of preheating for 90 seconds at such a temperature that the printed circuit board had a surface temperature of 150° C. followed by main heating under such conditions that the surface temperature of the circuit board was kept for about 30 seconds at 200° C. or above with its peak temperature being 220–230° C.

After soldering, the soldered chip capacitors were visually observed for tombstoning. Tombstoning was not found in any of the soldered chip capacitors.

The DSC curve of the solder alloy used in this example (62%Sn—0.4%Ag—0.2%Sb—Pb) is shown in FIG. 1. As can be seen from this figure, the liquidus and solidus temperatures appear at 177° C. and 185° C., respectively, to give a solidification temperature range of 8° C. There are two peaks between the liquidus and solidus temperatures. The first lower peak appears at 178° C. and the second higher peak is found at 181° C. An additional phase transformation point appears at a temperature just below the solidus temperature, whereby the solidification temperature range between the liquidus and solidus temperatures is further extended.

The soldering properties of the solder paste were tested by applying a given amount of the solder paste to the surface of a 30 mm-square copper plate. The copper plate was heated to a peak temperature of 50° C. above the liquidus temperature of the solder alloy. The appearance of the solder on the copper plate after heating was visually observed and evaluated as follows:

Good: Sufficient wetting and spreading of the solder;

Fair: Partial wetting and spreading of the solder; and

Poor: Little wetting and spreading of the solder.

The test results are shown in Table 1 along with the alloy composition of the solder powder and the various phase transformation temperatures thereof.

Examples 2 to 6 and Comparative Examples 1 to 4

Solder pastes containing solder powders having the compositions shown in Table 1 were prepared and tested in the same manner as described in Example 1. The solder alloy in Comparative Example 1 was a conventional eutectic alloy while those in Comparative Examples 2 to 5 were prior art solder alloys disclosed in Japanese Patent Application Laid-Open No. 5-212580(1993). The solidus and liquidus temperatures as well as peak temperatures between the solidus and liquidus temperatures of these alloys are also shown in Table 1 along with the test results.

The eutectic solder alloy used in Comparative Example 1 had a single peak at 183° C. and caused tombstoning in reflow soldering. On the other hand, the other comparative solder alloys used in Comparative Examples 2 to 5 had twin peaks between the solidus and liquidus temperatures and caused no tombstoning. However, each of these alloys had a liquidus temperature higher than 200° C., as a result of which its soldering properties were impaired.

In contrast, all the solder alloys used in Examples 1 to 6 had twin peaks and a liquidus temperature below 200° C. As a result, no tombstoning occurred in reflow soldering using these solder alloys and their soldering properties were good.

TABLE 1

| Example No. | Alloy Composition (%, balance: Pb) | | | | Melting Temp. (° C.) | | Peak Temp. (° C.) | | Tomb-ston-ing | Solder-ing Pro-perties |
|---|---|---|---|---|---|---|---|---|---|---|
| | Sn | Ag | Sb | Others | Sol. | Liq. | 1st | 2nd | | |
| Example 1 | 62 | 0.4 | 0.2 | — | 177 | 185 | 178 | 181 | None | Good |
| Example 2 | 62 | 0.1 | 0.2 | — | 177 | 185 | 178 | 181 | None | Good |
| Example 3 | 62 | 0.6 | 2.0 | — | 179 | 191 | 181 | 183 | None | Good |
| Example 4 | 62 | 0.3 | 1.0 | — | 178 | 188 | 179 | 183 | None | Good |
| Example 5 | 60 | 0.5 | 0.5 | — | 178 | 190 | 179 | 181 | None | Good |
| Example 6 | 65 | 0.5 | 0.5 | — | 178 | 187 | 179 | 181 | None | Good |
| Comparative Example 1 | 63 | — | — | — | 183 | 183 | 183 | — | Occurred | Good |
| Comparative Example 2 | 92 | 3 | — | Cu: 1 | 178 | 218 | 178 | 216 | None | Fair |
| Comparative Example 3 | 86 | — | — | Zn: 10 | 168 | 216 | 169 | 199 | None | Poor |
| Comparative Exainple 4 | 93.6 | 1.2 | — | — | 178 | 223 | 178 | 219 | None | Fair |
| Comparative Example 5 | 88.8 | 1.2 | — | — | 178 | 218 | 178 | 213 | None | Fair |

It will be appreciated by those skilled in the art that numerous variations and modifications may be made to the invention as described above with respect to specific embodiments without departing from the spirit or scope of the invention as broadly described.

What is claimed is:

1. A method for preventing tombstoning during reflow soldering leadless chip components on a printed circuit board by using a solder paste which comprises a solder powder admixed with a viscous flux, wherein the solder powder has a twin-peak alloy composition consisting essentially, on a weight basis, of: 60–65% Sn, 0.1–0.6% Ag, 0.1–2% Sb, and a balance of Pb.

2. The method of claim 1 wherein the alloy composition of the solder powder has an Sn content of 61–64%.

3. The method of claim 1 wherein the alloy composition of the solder powder has an Ag content of 0.2–0.5%.

4. The method of claim 1 wherein the alloy composition of the solder powder has an Sb content of 0.1–1%.

5. The method of claim 1 wherein the reflow soldering is performed by heating in a furnace at a peak temperature below 250° C.

6. The method of claim 1 wherein the alloy of the solder powder is a twin-peak solder alloy.

7. A method for preventing tombstoning during reflow soldering leadless chip components on a printed circuit board by using a solder paste which comprises a solder powder admixed with a viscous flux, wherein the solder powder has a twin-peak alloy composition consisting essentially, on a weight basis of 60–65% Sn, 0.1–0.6% Ag, 0.1–2% Sb, and a balance of Pb, and where the solder has a liquidous temperature of 200 degrees or below.

* * * * *